United States Patent
Sullivan et al.

(10) Patent No.: US 11,845,438 B1
(45) Date of Patent: Dec. 19, 2023

(54) SHIFT POINT ADAPTATION METHOD FOR A VEHICLE POWERTRAIN

(71) Applicant: FORD GLOBAL TECHNOLOGIES, LLC, Dearborn, MI (US)

(72) Inventors: Conor Edward Sullivan, Canton, MI (US); Markian Oleh Diakiw, Livonia, MI (US); Kurt Howard Nickerson, Shelby Township, MI (US); Thaddeus Hill, Livonia, MI (US); Cory Benson Laroche, Commerce Township, MI (US); Donald Gerald Levens, Plymouth, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 17/953,600

(22) Filed: Sep. 27, 2022

(51) Int. Cl.
| | |
|---|---|
| *B60W 10/11* | (2012.01) |
| *B60W 30/19* | (2012.01) |
| *F16H 61/30* | (2006.01) |
| *F16H 59/48* | (2006.01) |
| *B60W 10/06* | (2006.01) |
| *F16H 59/20* | (2006.01) |
| *F02D 41/04* | (2006.01) |

(52) U.S. Cl.
CPC ............ *B60W 30/19* (2013.01); *B60W 10/06* (2013.01); *B60W 10/11* (2013.01); *F02D 41/042* (2013.01); *F16H 59/20* (2013.01); *F16H 59/48* (2013.01); *F16H 61/30* (2013.01); *B60W 2510/0638* (2013.01); *B60W 2540/10* (2013.01); *B60W 2540/103* (2013.01); *B60W 2710/06* (2013.01); *B60W 2710/1005* (2013.01); *B60W 2710/1077* (2013.01); *F02D 2200/0404* (2013.01)

(58) Field of Classification Search
CPC ...... B60W 30/19; B60W 10/06; B60W 10/11; B60W 2510/0638; B60W 2540/103; B60W 2710/06; B60W 2710/1005; B60W 10/115; B60W 2540/10; B60W 2710/1077; F16H 59/20
USPC .............................................. 701/55, 58, 59
See application file for complete search history.

(56) References Cited

U.S. PATENT DOCUMENTS

| | | | | |
|---|---|---|---|---|
| 4,698,763 | A * | 10/1987 | Smyth | ................. F16H 61/0213 701/56 |
| 6,295,498 | B1 * | 9/2001 | Gleason | .............. F16H 61/0213 477/121 |
| 9,404,468 | B2 | 8/2016 | Glugla et al. | |
| 10,253,708 | B2 | 4/2019 | Watanabe et al. | |
| 10,344,851 | B2 * | 7/2019 | Haria | .................. F16H 61/0204 |
| 2008/0058159 | A1 | 3/2008 | Watanabe et al. | |
| 2013/0109534 | A1 | 5/2013 | Probert et al. | |
| 2017/0167601 | A1 * | 6/2017 | Yang | ....................... F16H 59/46 |

(Continued)

*Primary Examiner* — Roger L Pang
(74) *Attorney, Agent, or Firm* — Vincent Mastrogiacomo; Brooks Kushman P.C.

(57) ABSTRACT

A vehicle includes an engine, a transmission, and a controller. The engine is configured to generate power to propel the vehicle. The transmission has gears and clutches configured to shift between the gears. The controller is programmed to operate the clutches during wide-open throttle events to upshift the gears at shift points corresponding to engine speeds. The controller is further programmed to adapt the shift points by increasing the shift points over a series of the wide-open throttle events from initial values to mature values.

20 Claims, 7 Drawing Sheets

(56) References Cited

U.S. PATENT DOCUMENTS

2020/0079344 A1* 3/2020 Öberg .................... B60W 10/11
2021/0025489 A1   1/2021 Wardle et al.

* cited by examiner

SHIFT POINT ADAPTATION METHOD FOR A VEHICLE POWERTRAIN

TECHNICAL FIELD

The present disclosure relates to vehicle transmissions.

BACKGROUND

Vehicle transmissions may include hydraulic systems that utilize pressurized hydraulic fluid to engage/disengage various clutches within the transmission in order to establish multiple gear ratios between an input and an output of the transmission.

SUMMARY

A vehicle includes an engine, a step-ratio transmission, an accelerator pedal, and a controller. The engine is configured to generate power to propel the vehicle. The step-ratio transmission has a plurality of gears and a plurality of clutches configured to shift between the gears. The controller is programmed to operate the plurality of clutches during acceleration events to upshift the plurality of gears at shift points corresponding to engine speeds. The controller is further programmed to adapt the shift points via increasing the shift points over a subset of the acceleration events from initial values toward mature values. The subset of acceleration events corresponds to acceleration events where the accelerator pedal is fully depressed.

A vehicle includes an engine, a transmission, and a controller. The engine is configured to generate power to propel the vehicle. The transmission has gears and clutches configured to shift between the gears. The controller is programmed to operate the clutches during wide-open throttle events to upshift the gears at shift points corresponding to engine speeds. The controller is further programmed to adjust the hydraulic pressure applied to each clutch over a series of the wide-open throttle events to drive engagement times of each clutch toward desired values. The controller is further programmed to adapt the shift points by increasing the shift points over the series of the wide-open throttle events from initial values to mature values in response to adjustments in the hydraulic pressure.

A vehicle includes an engine, a transmission, and a controller. The engine is configured to generate power to propel the vehicle. The transmission has gears and clutches configured to shift between the gears. The controller is programmed to operate the clutches during wide-open throttle events to upshift the gears at shift points corresponding to engine speeds. The controller is further programmed to adapt the shift points by increasing the shift points over a series of the wide-open throttle events from initial values to mature values.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
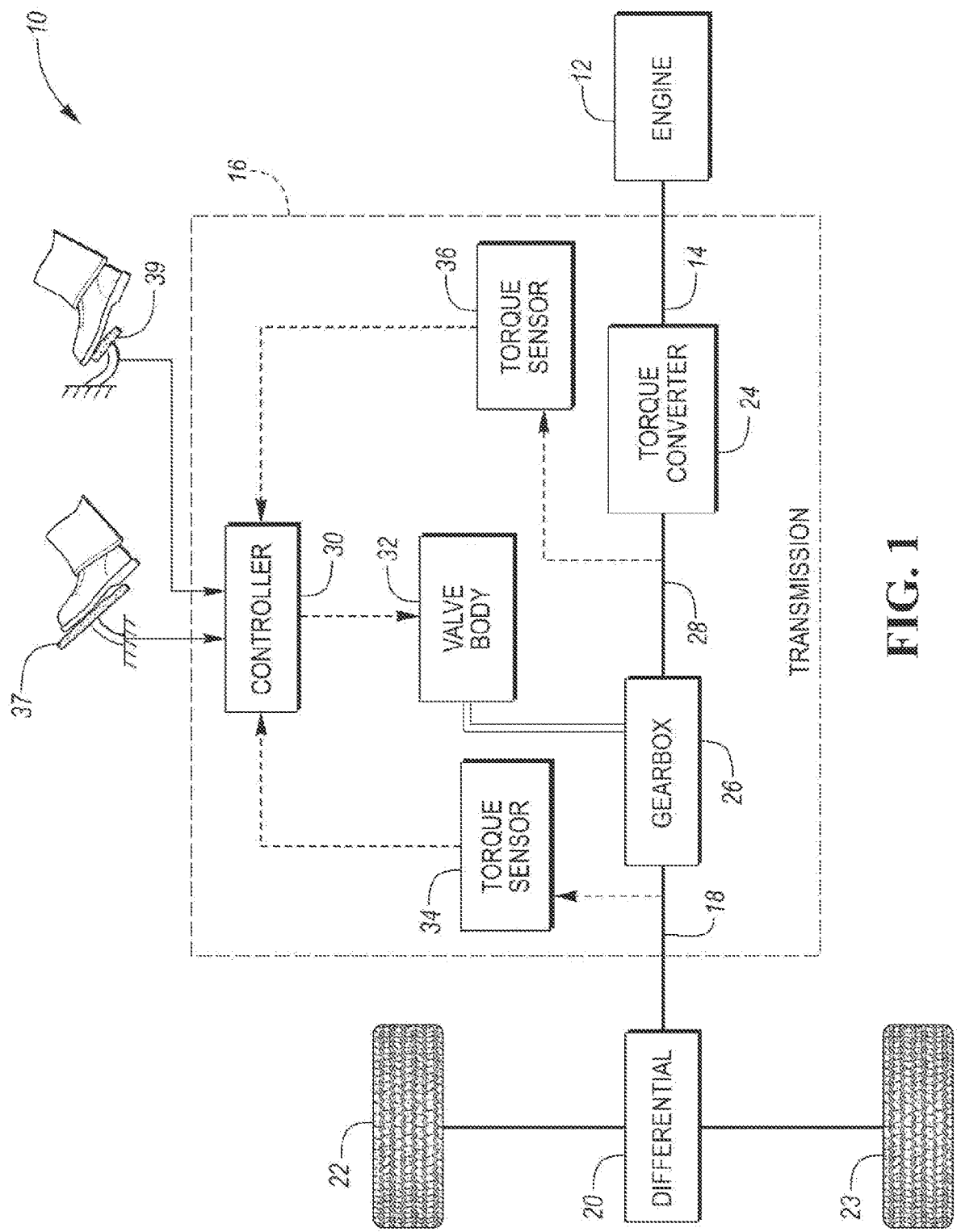
FIG. 1 is a schematic illustration of an exemplary vehicle and an exemplary vehicle powertrain.

A powertrain of a vehicle 10 is illustrated schematically in FIG. 1. Solid lines indicate mechanical connections. Broken lines represent the flow of signals. Double lines represent the flow of fluid. An engine 12 is configured to propel the vehicle 10. The engine 12 provides power to rotate a crankshaft 14. A transmission 16 transits the power from the crankshaft 14 to a driveshaft 18 while potentially modifying the speed and torque to be more suitable to the present vehicle requirements. A differential 20 distributes the power to a left wheel 22 and a right wheel 23 while permitting slight speed differences between the wheels such as when the vehicle 10 turns a corner.

The transmission 16 may be a step-ratio transmission that includes a torque converter 24 and a gearbox 26. Alternatively, the transmission may include a launch clutch as opposed to the torque converter 24. The torque converter 24 is a fluid coupling device that includes an impeller, stator, and turbine. The torque converter 24 transmits the power from the crankshaft 14 to a turbine shaft 28 (which may be referred to as an input shaft to the gearbox 26). The crankshaft 14 may be coupled to the impeller of the torque converter 24. The gearbox 26 transmits the power from the turbine shaft 28 to the driveshaft (or output shaft) 18. A controller 30 sends signals to a valve body 32 causing the valve body 32 to send pressurized fluid to clutches in the gearbox 26. The gear ratio of the gearbox 26 depends upon which subset of the clutches are provided with pressurized fluid. The controller 30 utilizes many inputs to determine what commands to send to valve body 32 including signals from an output torque sensor 34 and a turbine torque sensor 36. Additionally, the transmission 16 may include several speed sensors that may be utilized to determine the slip across all the internal clutches in the gearbox 26. The speed sensors may be located at the input of the transmission 16, at the output of the transmission 16, and at least two intermediate positions within the gearbox 26 of the transmission 16. The input of the transmission may refer to the crankshaft 14, the impeller of the torque converter 24, or the turbine (i.e., turbine shaft 28) of the torque converter 24. The output of the transmission 16 may refer to the driveshaft 18.

An accelerator pedal 37 is used by the driver of the vehicle 10 to provide a demanded torque, power, or drive command to propel the vehicle 10. In general, depressing and releasing the accelerator pedal 37 generates an accelerator pedal position signal that may be interpreted by the controller 30 as a demand for increased power or decreased power, respectively. A brake pedal 39 is also used by the driver of the vehicle 10 to provide a demanded braking torque to slow the vehicle. In general, depressing and releasing the brake pedal 39 generates a brake pedal position signal that may be interpreted by the controller 30 as a demand to decrease the vehicle speed. Based upon inputs from the accelerator pedal 37 and brake pedal 39, the controller 30 commands the torque to the engine 12 and the vehicles braking system (e.g., friction brakes). The controller 30 also controls the timing of gear shifts within the gearbox 26.

While illustrated as one controller, the controller 30 may be part of a larger control system and may be controlled by various other controllers throughout the vehicle 10, such as a vehicle system controller (VSC). It should therefore be understood that the controller 30 and one or more other controllers can collectively be referred to as a "controller" that controls various actuators in response to signals from various sensors to control functions the vehicle 10 or vehicle subsystems. The controller 30 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 30 in controlling the vehicle 10 or vehicle subsystems.

Control logic or functions performed by the controller 30 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 30. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

The controller 30 may be configured to receive various states or conditions of the various vehicle components illustrated in FIG. 1 via electrical signals. The electrical signals may be delivered to the controller 30 from the various components via input channels. Additionally, the electrical signals received from the various components may be indicative of a request or a command to change or alter a state of one or more of the respective components of the vehicle 10. The controller 30 includes output channels that are configured to deliver requests or commands (via electrical signals) to the various vehicle components. The controller 30 includes control logic and/or algorithms that are configured to generate the requests or commands delivered through the output channels based on the requests, commands, conditions, or states of the various vehicle components.

The input channels and output channels are illustrated as dotted lines in FIG. 1. It should be understood that a single dotted line may be representative of both an input channel and an output channel into or out of a single element. Furthermore, an output channel out of one element may operate as an input channel to another element and vice versa.

Figure 2:
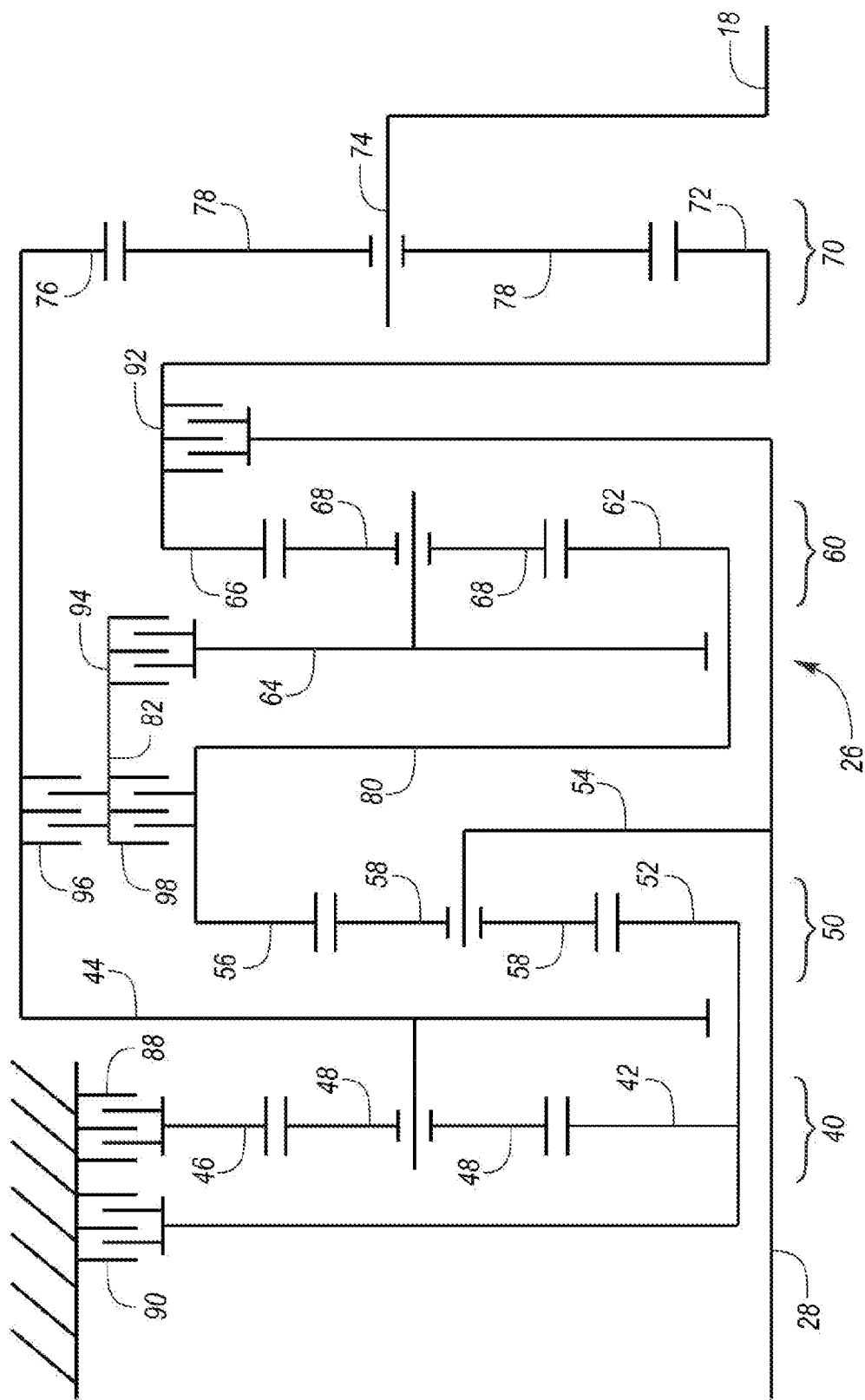
FIG. 2 is a schematic diagram of an exemplary transmission gearing arrangement.

An example gearbox is schematically illustrated in FIG. 2. The gearbox may also be referred to as a gearing arrangement. A gearing arrangement is a collection of rotating elements and clutches configured to impose specified speed relationships among elements. Some speed relationships, called fixed speed relationships, are imposed regardless of the state of any clutches. A gearing arrangement imposing only fixed relationships is called a fixed gearing arrangement. Other speed relationships are imposed only when particular clutches are fully engaged. A gearing arrangement that selectively imposes speed relationships is called a shiftable gearing arrangement. A discrete ratio transmission has a shiftable gearing arrangement that selectively imposes a variety of speed ratios between an input shaft and an output shaft.

A group of elements are fixedly coupled to one another if they are constrained to rotate as a unit in all operating conditions. Elements can be fixedly coupled by spline connections, welding, press fitting, machining from a common solid, or other means. Slight variations in rotational displacement between fixedly coupled elements can occur such as displacement due to lash. In contrast, two elements are selectively coupled by a clutch when the clutch constrains them to rotate as a unit whenever the clutch is fully engaged and they are free to rotate at distinct speeds in at least some other operating condition. Clutches include actively controlled devices such as hydraulically or electrically actuated clutches and passive devices such as one way clutches. A clutch that holds an element against rotation by selectively connecting the element to a fixed component, such as a transmission housing, may be called a brake.

It should be noted that the proposed method is applicable to a wide variety of gearbox arrangements and should not be limited to the gearbox in FIG. 2. The gearbox utilizes four simple planetary gear sets 40, 50, 60, and 70. Sun gear 42 is fixed to sun gear 52, carrier 44 is fixed to ring gear 76, ring gear 56 is fixed to sun gear 62 by shaft 80, ring gear 66 is fixed to sun gear 72, turbine shaft 28 is fixed to carrier 54, and driveshaft 18 is fixed to carrier 74. Ring gear 46 is selectively held against rotation by brake 88 and sun gears 42 and 52 are selectively held against rotation by brake 90. Turbine shaft 28 is selectively coupled to ring gear 66 and sun gear 72 by clutch 92. Intermediate element 82 (which may be a shaft) is selectively coupled to carrier 64 by clutch 94, selectively coupled to carrier 44 and ring gear 76 by clutch 96, and selectively coupled to shaft 80 by clutch 98.

As shown in Table 1, engaging the clutches and brakes in combinations of four establishes ten forward speed ratios and one reverse speed ratio between turbine shaft 28 and driveshaft 18. An X indicates that the corresponding clutch is engaged to establish the speed ratio.

TABLE 1

|      | 88 | 90 | 92 | 94 | 96 | 98 | Ratio | Step |
|------|----|----|----|----|----|----|-------|------|
| Rev  | X  | X  |    | X  | X  |    | -4.79 | 102% |
| 1st  | X  | X  | X  | X  |    |    | 4.70  |      |
| 2nd  | X  | X  |    | X  |    | X  | 2.99  | 1.57 |
| 3rd  | X  |    | X  | X  |    | X  | 2.18  | 1.37 |
| 4th  | X  |    |    | X  | X  | X  | 1.80  | 1.21 |
| 5th  | X  |    | X  |    | X  | X  | 1.54  | 1.17 |
| 6th  | X  |    |    | X  | X  | X  | 1.29  | 1.19 |
| 7th  |    | X  | X  | X  | X  |    | 1.00  | 1.29 |
| 8th  |    | X  | X  | X  | X  |    | 0.85  | 1.17 |
| 9th  |    | X  | X  |    | X  | X  | 0.69  | 1.24 |
| 10th |    | X  |    | X  | X  | X  | 0.64  | 1.08 |

All single step and two step shifts are performed by gradually engaging one clutch, called an oncoming element, while gradually releasing a different clutch, called the off-going element. During each of these shifts, three clutches, called holding elements, are maintained fully engaged while one element is maintained fully disengaged. In other gearbox arrangements, the number of holding elements may be different.

It should be understood that the transmission configuration described herein is merely exemplary and is not intended to be limited. Other transmission configurations should be construed as disclosure herein. Other transmission configurations may include manual transmissions, transmission that include a launch clutch as opposed to a torque converter, dual input clutch transmissions, etc.

It should be understood that the vehicle configuration described herein is merely exemplary and is not intended to be limited. Other non-hybrid or hybrid vehicle configurations should be construed as disclosed herein. Other vehicle configurations may include, but are not limited to, vehicles powered only by an engine, micro-hybrid vehicles (i.e., powered by an engine only that has a start/stop function), series hybrid vehicles, parallel hybrid vehicles, series-parallel hybrid vehicles, plug-in hybrid electric vehicles (PHEVs), or any other vehicle configuration known to a person of ordinary skill in the art.

In order to achieve peak power at high speeds, nominal wide-open throttle upshift speeds need to move closer to the hard fuel cutoff speed. The hard fuel cutoff speed may refer to an upper limit or threshold to the engine speed where the engine is shutdown (i.e., where fuel delivery system ceases to deliver fuel to the engine and/or cuts off electricity to the spark plugs) once the hard fuel cutoff speed has been exceeded to prevent detriment to the engine. A wide-open throttle event may correspond to events or scenarios where the operator of the vehicle 10 fully depresses the accelerator pedal 37.

Green (i.e., new) transmissions with little or no adaptive pressure control learning (i.e., where the engagement pressures to the clutches in the transmission have not yet been adapted due to little use of the vehicle) may have long hydraulic delay times while engaging and disengaging clutches in the transmission to shift between gears, which may result in engine speed reaching the hard fuel cutoff speed during upshifts, particularly during wide-open throttle events, which may detrimentally affect acceleration and shift feel. Wide-open throttle upshift points can only approach fuel cutoff speeds when variability in delay times is fully accounted for once the pressure control of the clutches in the transmission has been adapted over time.

To balance shift performance and drivability while providing peak power output, the method of adapting upshift points described herein alters the upshift points as pressure-control adaptive maturity increases. The method includes programming an initial maximum engine speed in for each gear of the transmission (e.g., the engine speed at which the transmission will upshift during wide-open throttle events) to ensure upshifts occur prior to reaching the hard fuel cutoff speed, even in the event of a worst-case hydraulic delay error. After each qualifying high torque upshift event, the method incrementally increases maximum allowed engine speed (e.g., the engine speed at which the transmission will upshift during wide-open throttle events) for each gear such that the maximum allowed engine speed (e.g., the engine speed at which the transmission will upshift during wide-open throttle events) approaches and eventually reaches a mature engine speed encompassing a peak or maximum power, while still ensuring the hard fuel cutoff speed is not reached and will not be reached during subsequent shift events. The method allows for restricting maximum allowed engine speed deltas in consecutive gears to balance drivability requirements during the adapting process.

Referring to FIG. 3-7, a flowchart and several bar graphs illustrate a method 100 for adapting the transmission shift points over time. The method 100 illustrated in FIG. 3 may be stored as control logic and/or an algorithm within the controller 30 and may be implemented by the controller 30 via controlling the various components illustrated in FIGS. 1 and 2 in response to receiving various inputs from the components and sensors illustrated in FIGS. 1 and 2, and via updating control parameters (e.g., shift point values) stored within the controller 30. The shift points in FIGS. 3-7 refer to engine speeds at which the gearbox 26 of the transmission 16 shifts between gears, particularly during wide-open throttle events. The flowchart in FIG. 3 refers to adapting shift points in the plural. However, it should be understood that the method 100 may be operated to adapt all of the shift points, some of the shift points, or one of the shift points. Therefore, all of the elements in the method 100 of FIG. 3 may be viewed in the singular.

The graphs in FIGS. 4-7 illustrate how the shift points are adapted from initial values toward the mature values during wide-open throttle events (e.g., acceleration events where the vehicle 10 is being accelerated and the accelerator pedal 37 is fully depressed). The mature values being the tops of each bar, the initial values being the tops of the portions of the bars labeled "initial," the adapted values being tops of the portions labeled "learned," and clipped values being the tops of the portions of the bars labeled "clipped." Each bar represents an upshift shift between two gears during a wide-open throttle event and is labelled with and "s" followed by two numbers. The first of the two numbers refers to the gear that the gearbox 26 is being shifted out of and the second of the two numbers refers to the gear that the gearbox 26 is being shifted into. For example, the label "s34" refers to a shift from 3rd gear to 4th gear, the label "s57" refers to a shift from 5th gear to 7th gear, the label "s89" refers to a shift from 8th gear to 9th gear, etc.

Figure 4:
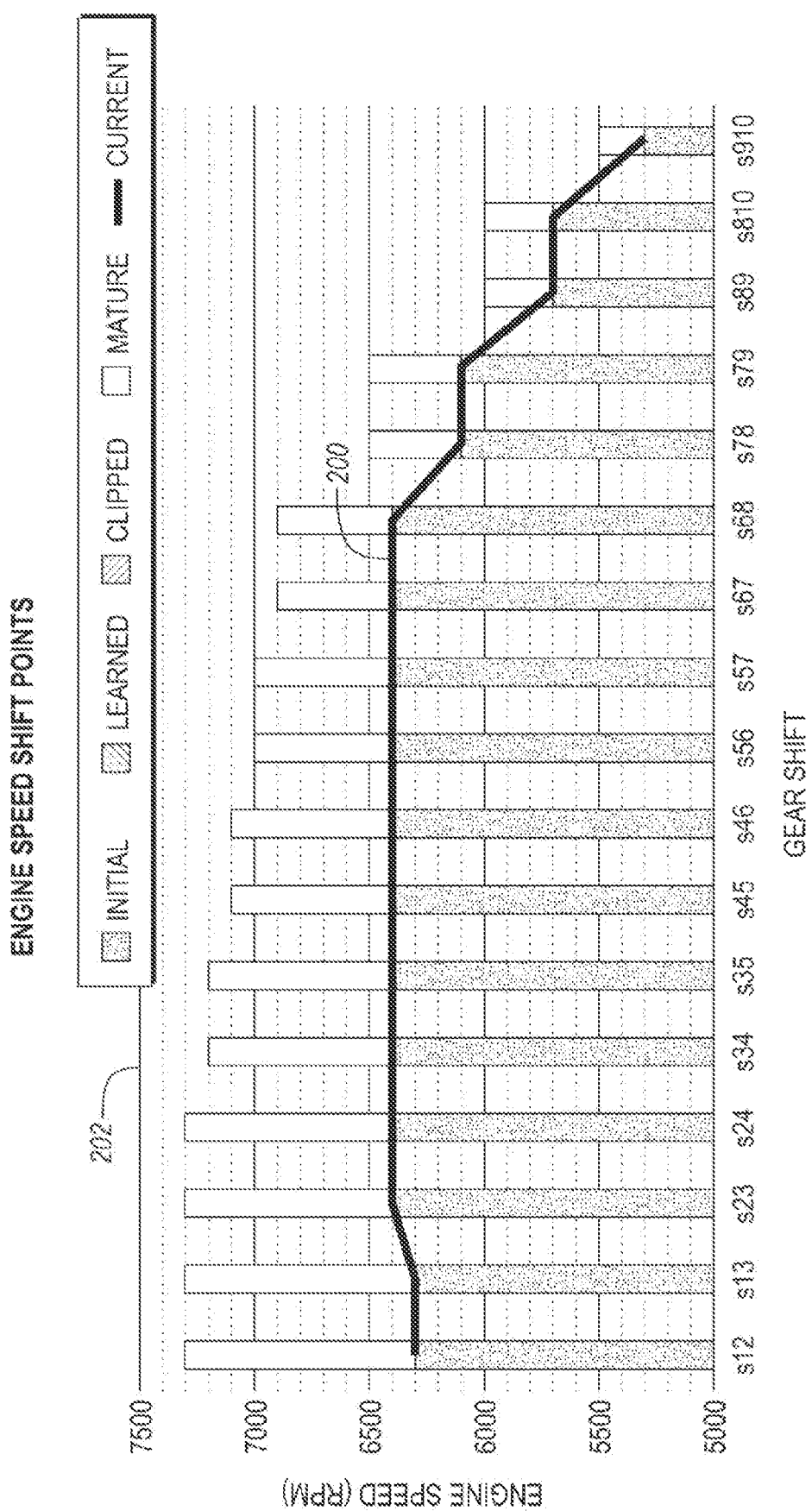
FIGS. 4-7 are series of graphs illustrating the adaptation of the transmission shift points over time.
Figure 5:
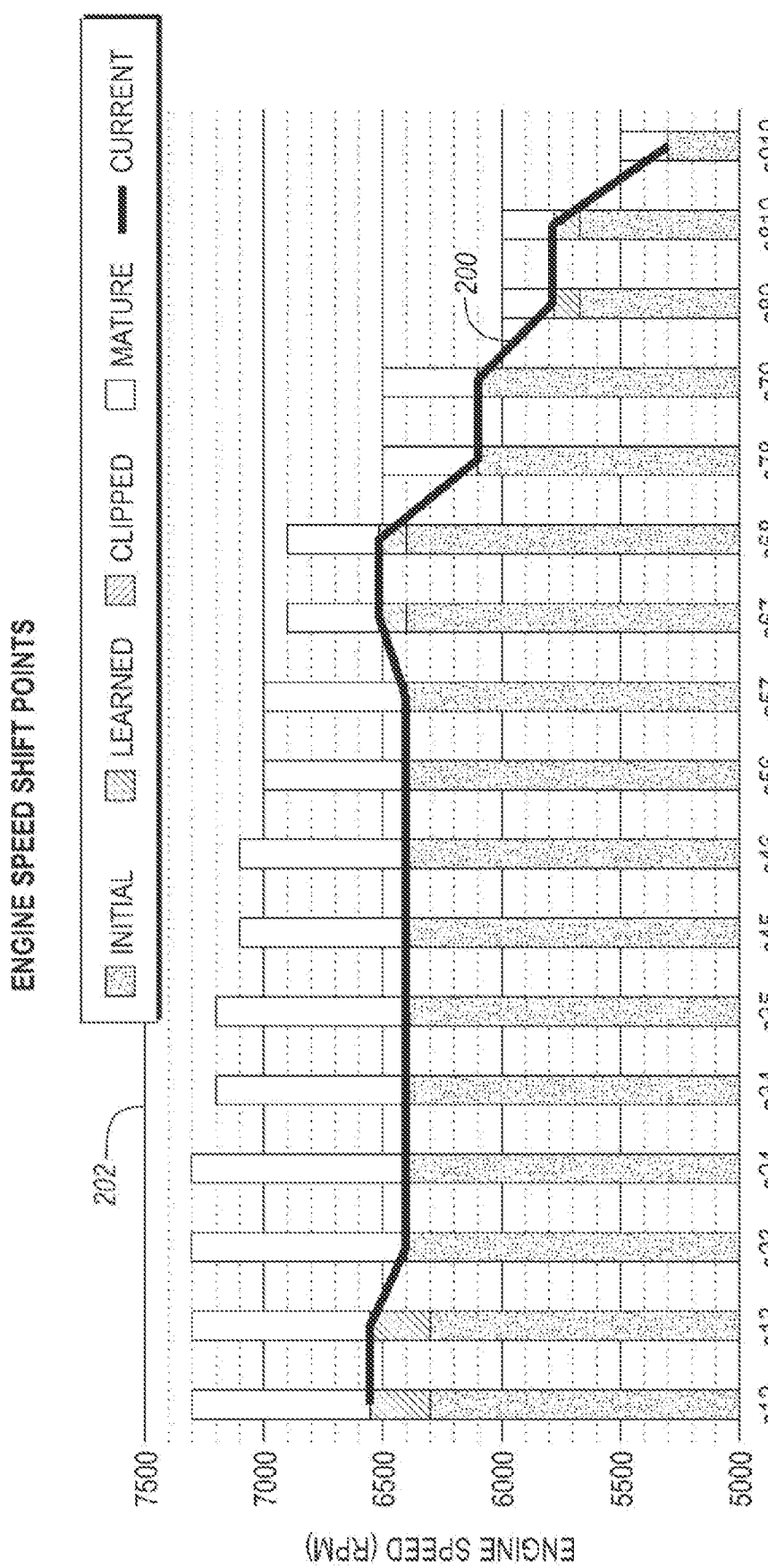
Figure 6:
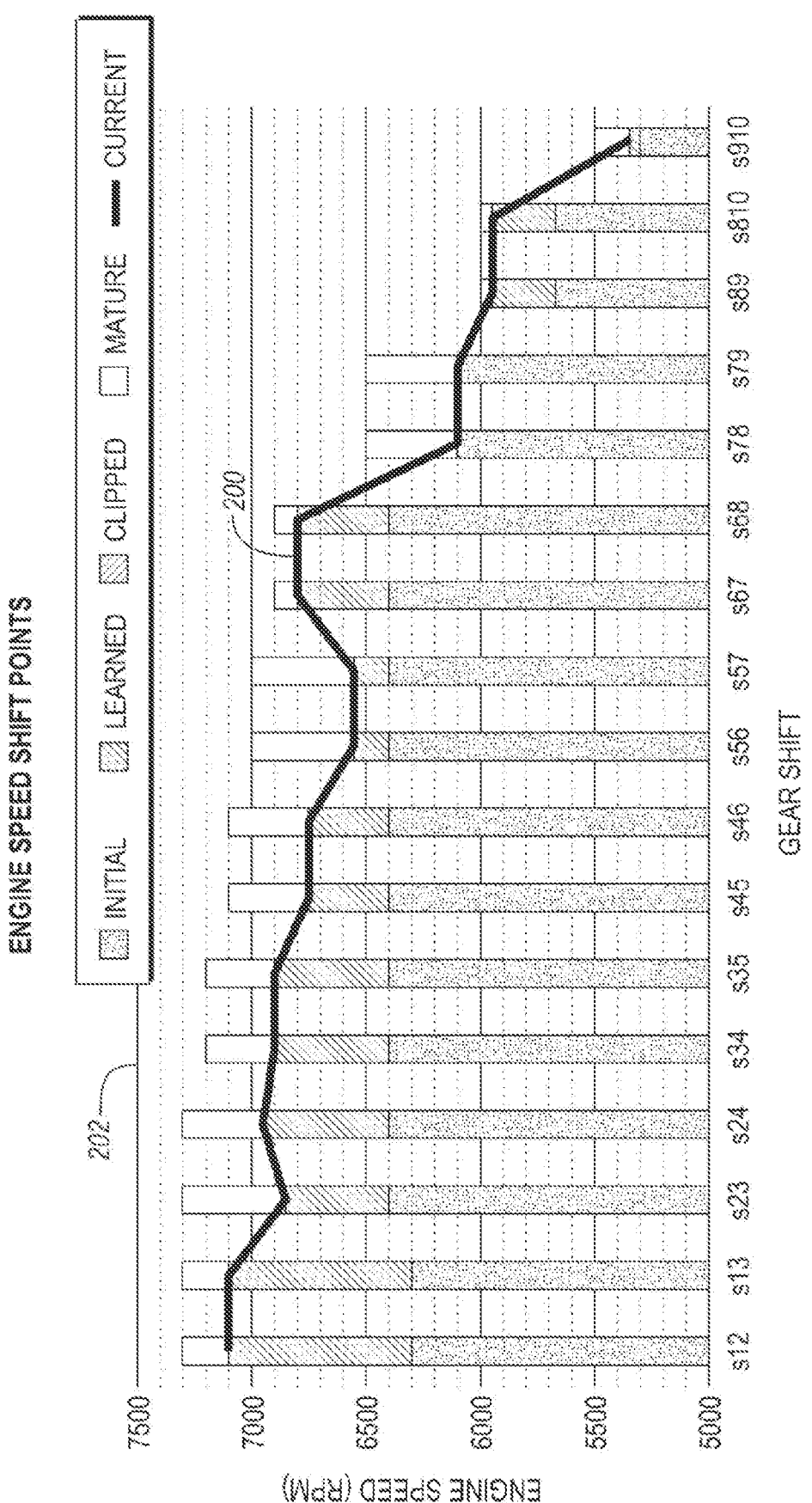
Figure 7:
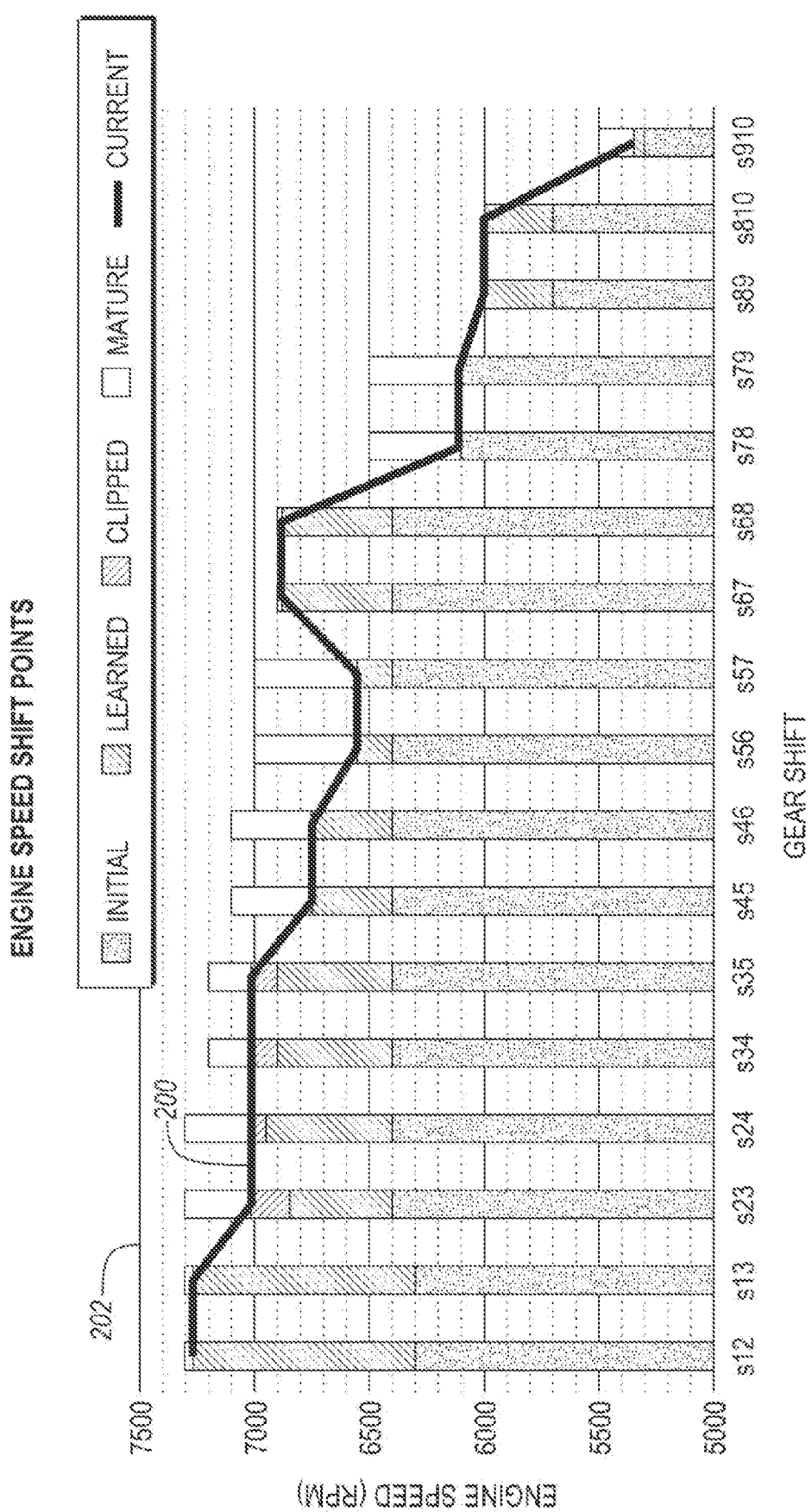

Current values of the shift points are illustrated by line 200 in FIGS. 4-7, which is either the mature value, the initial value, the learned value, or the clipped value at each shift point. In FIG. 4 the shift points are at the initial values, which are set sufficiently low to evade worst-case initial hydraulic delay error in clutch engagement. The mature values encompass a peak or maximum power, while still ensuring the hard fuel cutoff speed is not reached. The fuel cutoff speed is illustrated as line 202 in FIGS. 4-7 and is greater than each of the mature values of the shift points for all upshifts between gears during wide-open throttle events that are illustrated in FIG. 4-7. The controller 30 is configured to cease delivering fuel to the engine 12 (e.g., via shutting down a fuel pump, deactivating fuel injectors, etc.) in response to engine speed exceeding the fuel cutoff speed in order to protect the engine 12. The controller 30 may also cease delivering electricity to the spark plugs in response to engine speed exceeding the fuel cutoff speed. In FIG. 5 some of the shift points have adapted from the initial values but remain less than the mature values. In FIG. 6 most of the shift points have adapted from the initial values and remain less than the mature values, but have increased sufficiently such that a larger number of the shift points (approximately half) are closer to the mature values than to the initial values. In FIG. 7 most of the shift points have adapted from the initial values, most of the shift points have increased sufficiently such that the shift points are closer to the mature values than to the initial values, some of the shift points have increased to the mature values, and some have been clipped upward so that the shift point values of successive or adjacent gears are equal or relatively similar in value.

Figure 3:
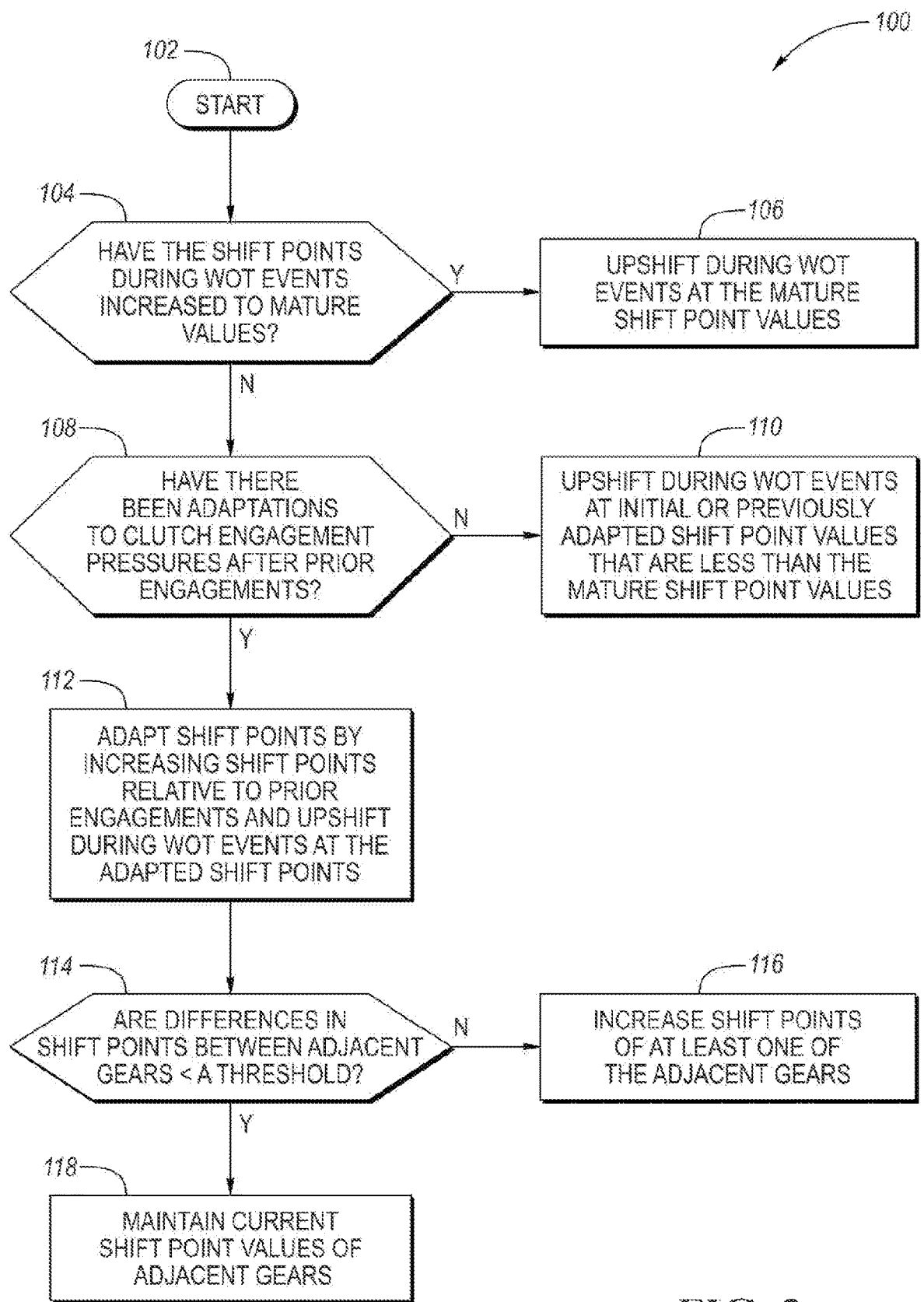
FIG. 3 is flowchart illustrating a method for adapting the transmission shift points over time.

The method 100 in FIG. 3 is initiated at start block 102. Next, the method 100 moves on to block 104 where it is determined if the shift points have been increased to the mature values over a series or subset of previous acceleration or wide-open throttle (WOT) events. If the shift points have been increased to the mature values, the method 100 moves on to block 106 where the clutches in the transmission (e.g., the clutches in gearbox 26) are disengaged and engaged at the mature shift point values to upshift between gears during a current acceleration or wide-open throttle event or during subsequent acceleration or wide-open throttle events. The method 100 may also cease to further adapt the shift points during wide-open throttle events once the mature shift point values have been obtained.

If the shift points have not been increased to the mature shift point values, the method 100 moves on to block 108 where it is determined if there have been adaptations or adjustments to the hydraulic engagement pressures applied to the clutches in the gearbox 26 after prior engagements, which may correspond to acceleration or wide-open throttle events, in order to drive the engagement times of clutch toward desired values. Initially the clutches may have variation in engagement times. The corresponding hydraulic pressure applied to each clutch is adjusted over several engagements, and particularly during clutch engagements corresponding to acceleration or wide-open throttle events, to drive the applied torque of each clutch and the engagement time for each clutch toward desired values.

If there have not been adaptations or adjustments to the hydraulic engagement pressures applied to the clutches in the gearbox 26 after the prior engagements, the method 100 moves on to block 110, where the clutches in the transmission (e.g., the clutches in gearbox 26) are disengaged and engaged at the initial shift point values (if there have been no previous adaptations to the shift points) or at previously adapted shift point values that are less than the mature shift point values but greater than the initial shift point values (if there have been previous adaptations to the shift points) to upshift between gears during a current acceleration or wide-open throttle event or during subsequent acceleration or wide-open throttle events.

If there have been adaptations or adjustments to the hydraulic engagement pressures applied to the clutches in the gearbox 26 after the prior engagements, the method 100 moves on to block 112, where the shift points are adapted by increasing the shift points relative to the initial shift point values or the previously adapted shift point values utilized during prior engagements and disengagements of the clutches during upshifts in the gearbox 26 corresponding to previous acceleration or wide-open throttle events. The clutches in the transmission (e.g., the clutches in gearbox 26) are then disengaged and engaged at these adapted shift point values to upshift between gears during a current acceleration or wide-open throttle event or during subsequent acceleration or wide-open throttle events. The adapted shift point values at block 112 are greater than the initial shift point values and are less than or equal to the mature shift point values. The prior engagements of the clutches referred to in blocks 108 and 112 may not refer to all prior engagements of the clutches but may refer to the most immediate prior engagement of the clutches.

Next, the method 100 moves on to block 114 where it is determined if the differences between the shift points, particularly during acceleration or wide-open throttle events, in a set of successive gears or adjacent gears in the gearbox 26 is less than a threshold. If the differences between the shift points in a set of successive gears or adjacent gears in the gearbox 26 is not less than the threshold, the method 100 moves on to block 116, where the shift point of at least one of the successive or adjacent gears is increased or clipped upward such that the difference in the shift points of the successive or adjacent gears is less than the threshold (see the graph in FIG. 7). Such clipping eliminates large disparities in upshift points between successive shifts, which could result in short shifting, which is not desired. If the differences between the shift points in a set of successive gears or adjacent gears in the gearbox 26 is less than the threshold, the method 100 moves on to block 118, where the shift points of the successive or adjacent gears is maintained.

The method 100 may continually operate over several upshifts during acceleration or wide-open throttle events such that a series or subset of acceleration or wide-open throttle events results in several adaptations at block 112 where the shift points are increased during each event prior to eventually obtaining the mature values. It should be understood that the flowchart in FIG. 3 is for illustrative purposes only and that the method 100 should not be construed as limited to the flowchart in FIG. 3. Some of the steps of the method 100 may be rearranged while others may be omitted entirely.

It should be understood that the designations of first, second, third, fourth, etc. for any component, state, or condition described herein may be rearranged in the claims so that they are in chronological order with respect to the claims. Furthermore, it should be understood that any component, state, or condition described herein that does not have a numerical designation may be given a designation of first, second, third, fourth, etc. in the claims if one or more of the specific component, state, or condition are claimed.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
   an engine configured to generate power to propel the vehicle;
   a step-ratio transmission having (i) a plurality of gears and (ii) a plurality of clutches configured to shift between the gears;
   an accelerator pedal; and
   a controller programmed to
      operate the plurality of clutches during acceleration events to upshift the plurality of gears at shift points corresponding to engine speeds,
      adapt the shift points via increasing the shift points over a subset of the acceleration events from initial values toward mature values, wherein the subset of the acceleration events corresponds to acceleration events where the accelerator pedal is fully depressed, and
      (i) adjust a hydraulic pressure applied to each clutch of the plurality of clutches during the acceleration events to drive engagement times of each clutch toward desired values and (ii) adapt the shift points in response to the adaptation of the clutches.

2. The vehicle of claim 1, wherein the controller is further programmed to, in response to a difference in shift points of successive gears of the plurality of gears exceeding a threshold during the adaptation of the shift points, increase the shift point of at least one of the successive gears such that the difference is less than the threshold.

3. The vehicle of claim 1, wherein the controller is further programmed to, in response to the shift points increasing to the mature values over the subset of the acceleration events, cease adaptation the shift points.

4. The vehicle of claim 3, wherein the controller is further programmed to, in response to the shift points increasing to the mature values over the subset of the acceleration events, operate the plurality of clutches during subsequent acceleration events to upshift the plurality of gears at the mature values of the shift points.

5. The vehicle of claim 1, wherein the controller is further programmed to, in response to the engine speed exceeding a cutoff threshold, cease delivering fuel to the engine.

6. The vehicle of claim 5, wherein the cutoff threshold is greater than the each of the mature values.

7. The vehicle of claim 1, wherein at least one of the shift points corresponds to an upshift that adjusts a gear ratio within the step-ratio transmission by two gears.

8. The vehicle of claim 1, wherein at least one of the shift points corresponds to an upshift that adjusts a gear ratio within the step-ratio transmission by one gear.

9. A vehicle comprising:
   an engine configured to generate power to propel the vehicle;
   a transmission having (i) gears and (ii) clutches configured to shift between the gears; and
   a controller programmed to
      operate the clutches during wide-open throttle events to upshift the gears at shift points corresponding to engine speeds,
      adjust a hydraulic pressure applied to each clutch over a series of the wide-open throttle events to drive engagement times of each clutch toward desired values, and
      adapt the shift points by increasing the shift points over the series of the wide-open throttle events from initial values to mature values in response to adjustments in the hydraulic pressure.

10. The vehicle of claim 9, wherein the controller is further programmed to, in response to a difference in shift points of adjacent gears exceeding a threshold during the adaptation of the shift points, increase the shift point of at least one of the adjacent gears such that the difference is less than the threshold.

11. The vehicle of claim 9, wherein the controller is further programmed to, in response to the shift points increasing to the mature values over the series of the wide-open throttle events, cease adaptation the shift points.

12. The vehicle of claim 11, wherein the controller is further programmed to, in response to the shift points increasing to the mature values over the series of the wide-open throttle events, operate the clutches during subsequent wide-open throttle events to upshift the gears at the mature values of the shift points.

13. The vehicle of claim 9, wherein the controller is further programmed to, in response to the engine speed exceeding a cutoff threshold, cease delivering fuel to the engine.

14. The vehicle of claim 13, wherein the cutoff threshold is greater than the each of the mature values.

15. A vehicle comprising:
   an engine configured to generate power to propel the vehicle;
   a transmission having (i) gears and (ii) clutches configured to shift between the gears; and
   a controller programmed to
      operate the clutches during wide-open throttle events to upshift the gears at shift points corresponding to engine speeds,
      adapt the shift points by increasing the shift points over a series of the wide-open throttle events from initial values to mature values, and
      in response to a difference in shift points of adjacent gears exceeding a threshold during the adaptation of the shift points, increase the shift point of at least one of the adjacent gears such that the difference is less than the threshold.

16. The vehicle of claim 15, wherein the controller is further programmed to, in response to the shift points increasing to the mature values over the series of the wide-open throttle events, cease adaptation the shift points.

17. The vehicle of claim 16, wherein the controller is further programmed to, in response to the shift points increasing to the mature values over the series of the wide-open throttle events, operate the clutches during subsequent wide-open throttle events to upshift the gears at the mature values of the shift points.

18. The vehicle of claim 15, wherein the controller is further programmed to, in response to the engine speed exceeding a cutoff threshold, cease delivering fuel to the engine.

19. The vehicle of claim 18, wherein the cutoff threshold is greater than the each of the mature values.

20. The vehicle of claim 15, wherein the controller is further programmed to (i) adjust a hydraulic pressure applied to each clutch over the series of wide-open throttle events to drive engagement times of each clutch toward desired values and (ii) adapt the shift points in response to the adaptation of the clutches.

\* \* \* \* \*